United States Patent [19]

Bernard

[11] 4,441,139

[45] Apr. 3, 1984

[54] PROCESS FOR PRODUCING A WOUND CAPACITOR AN APPARATUS FOR IMPLEMENTING THE PROCESS AND A CAPACITOR THUS OBTAINED

[75] Inventor: Daniel Bernard, Bagnolet, France

[73] Assignee: L.C.C.-C.I.C.E.-Compagnie Europeenne de Composants Electroniques, Bagnolet, France

[21] Appl. No.: 350,155

[22] Filed: Feb. 19, 1982

[30] Foreign Application Priority Data

Feb. 27, 1981 [FR] France ............................... 81 03991

[51] Int. Cl.³ ..................... H01G 1/015; H01G 4/06; H01G 7/00
[52] U.S. Cl. ................................. 361/304; 29/25.42; 361/311
[58] Field of Search ..................... 29/25, 42; 361/301, 361/311, 304, 313, 323, 324

[56] References Cited

U.S. PATENT DOCUMENTS 1,904,876  4/1933  Park .................................. 29/25.42
4,352,145  9/1982  Stockman ...................... 29/25.42 X

FOREIGN PATENT DOCUMENTS 2091309  1/1972  France .
2379895  9/1978  France .
 821419 10/1959  United Kingdom .

*Primary Examiner*—Donald A. Griffin

[57] ABSTRACT

A process is provided for producing a wound capacitor in which at least two films of metal coated dielectric material are wound one on the other, the metal layers forming the plates of said capacitor whose instantaneous capacity is measured by means of a bridge. When the capacity measured is close to but slightly less than the desired capacity, partial stripping of the metal from one of the metal coated films is effected, so as to maintain thereon a metal coated strip, connected electrically to the corresponding plate of the capacitor and allowing the value of the desired capacity to be adjusted accurately without slowing down the winding speed of said capacitor.

8 Claims, 4 Drawing Figures

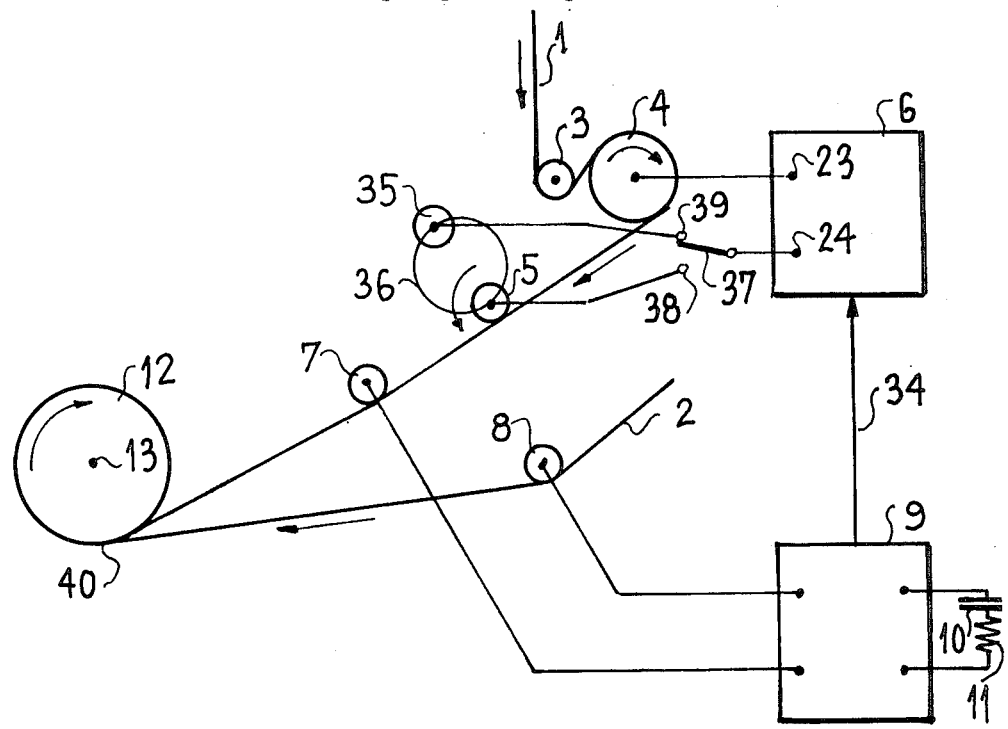
FIG_1
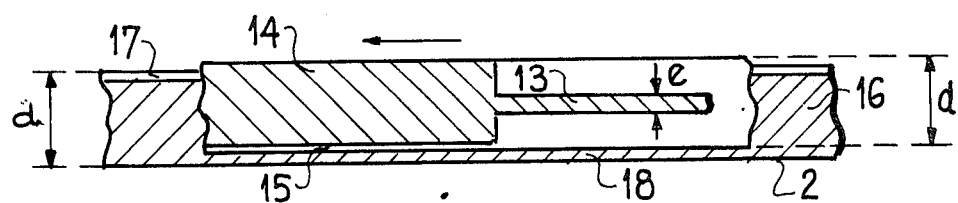
FIG_2
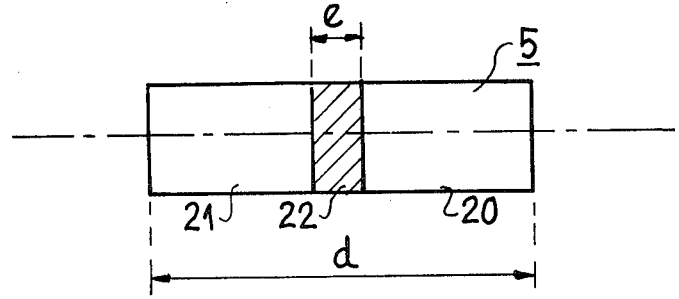
FIG_3

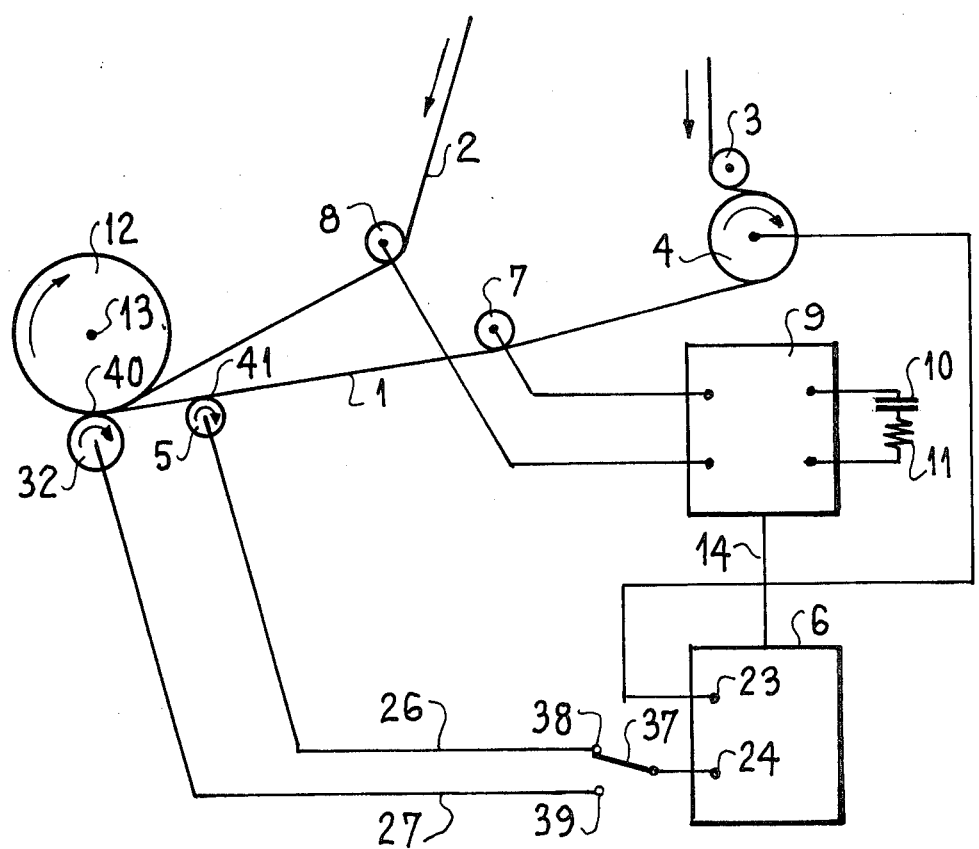
FIG_4

PROCESS FOR PRODUCING A WOUND CAPACITOR AN APPARATUS FOR IMPLEMENTING THE PROCESS AND A CAPACITOR THUS OBTAINED

BACKGROUND OF THE INVENTION

The present invention relates to a process for producing a wound capacitor of capacity C, in which process at least two films of metal coated dielectric material are wound up one on the other, the metal layers forming the plates of said capacitor, the instantaneous capacity Cx of the capacitor being measured at all times by means of capacity measuring means.

Different methods are known for producing wound capacitors from metal coated dielectric films.

A first method consists in counting the number of turns formed and in stopping the machine after a predeterminded number of turns. However, such a method has proved very inaccurate giving rise to a very great dispersion in the capacities of the capacitors produced. Such a method is only generally suitable for very high capacities for which the relative accuracy of the value of the capacity remains nevertheless acceptable.

Another known method consists in winding simultaneously the two metal coated dielectric films with a machine comprising a capacity bridge which follows the evolution of the capacity of the capacitor thus wound and stops the machine when the desired value is reached. However, with this method very high capacities cannot be wound in a single operation for then the resistance of the metal coating becomes too high and thus falsifies the measurement of the value of the capacity. This problem has been solved in practice by proceeding in several successive steps: for example, to produce a capacitor having a capacity of 10 microfarads, the measuring bridge is adjusted to 2 microfarads, a first winding of 2 microfarads is made and then the metal layer is removed from one of the plates so as to isolate the beginning of this winding from the rest of the capacitor. Then a new winding of 2 microfarads is formed on the first one, and so on until the desired value is obtained. Thus, the resistance due to the metal layers is much smaller and an improvement is obtained in the relative accuracy of the capacitors thus obtained. It should in fact be stated that the measurement of the capacity during winding cannot of course be effected at the lateral Schooping connections as is the case with a finished capacitor, since they have not yet been formed at this stage of the process. Consequently, the measurement of the capacity is generally effected by means of two conducting rollers disposed in contact with the metal layers of each of the two dielectric films just before winding thereof. Consequently, the resistance of each metal layer has considerable influence since a part of the AC current used for measuring said capacity is propagated as far as the end of each metal coated dielectric film which may have a length of several hundreds of meters.

The second method described above does not however give entire satisfaction for small capacity values, for the capacity variation per unit of length is in this case high, whereas the mechanical accuracy of the machine is imperfect (by capacity variation per unit of length is to be understood the capacity variation per unit of length of wound film). These two factors cause then a not inconsiderable dispersion of the values of the capacities of capacitors thus produced.

SUMMARY OF THE INVENTION

The process in accordance with the invention avoids these drawbacks. To this end, according to the process of the invention, when capacity Cx is close to but less than C, the metal layer of one of the metal coated films is partially removed, so as to maintain thereon a metal coated strip, electrically connected to the corresponding plate of the capacitor and allowing precisely the value of capacity Cx to be adjusted to the value C, without slowing down the winding speed of said capacitor.

In such a process, in particular when the width of the remaining metal coated strip is small, the increase in the capacity Cx of the capacitor during winding is then extremely slow, whatever the winding speed used. In fact, since the value of the capacity depends particularly on the corresponding surface of the facing plates, a small increase in the surface of one of them results in a small increase in the capacity of the capacitor. When the desired value C of the capacity is reached, the winding is stopped and, despite the mechanical inaccuracy of the machine, the variation in the capacity of the capacitor with respect to the theoretical value will therefore be extremely low. Furthermore, the capacity per unit of length of said capacitor is reduced, which reduces correlatively the influence of the active strip which, at the time when it is desired to stop the winding of the capacitor, is not yet in this latter.

Preferably, the metal coated strip will extend substantially parallel to the edges of the dielectric film. Such a mode of construction is in fact particularly simple to achieve for example by means of a metal stripping roller comprising two electrically conducting portions separated by an insulating portion of a width corresponding to that of the metal coated strip. The metal coated face of the corresponding dielectric film and the conducting portions of the metal stripping roller are subjected to a sufficient potential difference so that, while the metal coated film is in contact with said roller, the parts facing the conducting portions of the roller are stripped of metal. Preferably, so as to give the process greater efficiency, the metal stripping roller will be rotated in the direction opposite the travelling direction of the film to be stripped of metal. This rotational speed may be adjusted to a large extent, but it will be preferably relatively high with respect to the travelling speed of said film.

The metal coated strip of small width, disposed parallel to the edges of the dielectric film, will be at a minimum distance therefrom depending on the equipment used. It is in fact essential for this metal coated strip to be always above the metal coated portion of the other film forming the capacitor so that its contribution to the value of the capacity is really efficient. This is why it will be preferable to dispose this small width metal coated strip substantially at an equal distance from the edges of said dielectric film.

Furthermore, considering the fact that wound capacitors always comprise a number of "dead" turns, it is provided, on a measuring bridge signal, for one of the metal coated dielectric films to be completely stripped of metal when the capacity value is reached. To this end, the complete and partial metal stripping rollers may be disposed on a turret which pivots from one to the other according to the type of metal stripping to be carried out and which is raised when neither of these operations is necessary.

According to a variation allowing the value of the capacity to be even better adjusted, the total metal stripping roller is disposed above the wound cylinder, the partial metal stripping roller being disposed upstream. When the exact capacity value is reached, the total metal stripping roller is lowered and thus suppresses the metal coated film portion of small width situated between the partial and total metal stripping rollers, which therefore increases the accuracy of the capacity value.

BRIEF DESCRIPTION OF THE DRAWINGS

The invention will be better understood from the following embodiments given by way of non limiting examples, with reference to the figures which show:

FIG. 1, an apparatus for implementing the process of the invention,

FIG. 2, a view of the two metal coated films forming the wound capacitor, the upper film having a portion stripped of metal in accordance with the invention, FIG. 3, a view of a wound capacitor in accordance with the invention before formation of the lateral schooping connections and coating of the assembly, and FIG. 4, another embodiment of FIG. 1 with the metal stripping rollers situated externally of the wound capacitor.

DESCRIPTION OF THE PREFERRED EMBODIMENTS

In FIG. 1, the two metal coated dielectric films 1 and 2 forming a wound capacitor travel in the direction of the arrows shown in this figure and are wound simultaneously so as to form a wound capacitor 12. The upper film 1 passes successively in contact with a first blocking roller 3 and a second blocking roller 4 before being wound on mandrel 13. This second blocking roller 4 made from an electrically conducting material is also used for bringing the metal coated layer of film 1 to a reference potential, e.g. ground, by means of the power supply source 6, the other pole of which is connected through the change-over switch 37 either to terminal 38 and to the partial stripping roller 5 or to terminal 39 and the total metal stripping roller 35. These two rollers are disposed on a turret 36. This turret is raised or lowered depending on the signals fed through 34 to the change-over switch 37 as well as to means for controlling the turret, not shown in the figure. A capacity measuring bridge 9, well known to a man skilled in the art, is connected on the one hand to both conducting rollers 7 and 8 in contact with the metal coated faces of films 1 and 2 so as to measure the capacity of the capacitor being wound, and on the other hand to a capacity 10 in series with a resistor 11. Capacity 10 corresponds to the value C of the capacity which it is desired to obtain, whereas the series resistor 11 partially compensates for the resistance of the metal layers created by the measurement by means of rollers 7 and 8.

The operation of such a device follows readily enough from the figure. The capacity bridge 9 allows the approximate value of the capacity Cx of capacitor 12 being wound to be checked at any moment. For a value Cx of this capacity, equal to C−x% of the value of C, the capacity bridge 9 sends a control signal through 34 to the change-over switch 37 which changes over to contact 38 while the turret 36 is lowered. A potential difference between roller 4 and roller 5 is established and consequently between the metal coated surface of film 1 and roller 5. This voltage, generally a DC voltage, may be of a few volts only, depending on the travelling speed of the metal coated film 1 as well as the thickness of said metal coated layer. Preferably, a voltage will be used of the order of a few tens of volts. The metal stripping roller 5, kept constantly rotating in the direction opposite the travelling direction of metal coated film 1, then strips the metal therefrom in the portion facing its conducting parts. The evolution of the value Cx of the capacity occurs from this moment on much more slowly, which allows a better control thereof and allows the rotation of mandrel 13 to be stopped when the value C of the capacity is reached. A signal is then generated by the capacity bridge 9 through 34 and the change-over switch 37 changes over to contact 39 while the turret 36 pivots, applying the total metal stripping roller 35 to the metal coated surface of film 1. After total stripping of metal from a few units of length, mandrel 13 is stopped, films 1 and 2 cut and the operation may begin again.

In FIG. 2 there is shown a partial view of the two metal coated films 1 and 2, the upper film 1 having a metal coated strip 13 in accordance with the invention. In a way known per se, the dielectric films 1 and 2 are coated respectively with a metal layer 14 and 16 but comprise respectively at one of their edges zones without a metal layer 15 and 17. The zones are provided so as to avoid short circuits during the operations for forming the lateral schooping connections. The metal coated films 1 and 2 are substantially of the same width d. The upper film 1 has a metal coated strip 13 of width e very much less than d. As a general rule, the width e will vary between 0.2 and 1 mm.

FIG. 3 shows a schematical view of the metal stripping roller 5 of FIG. 1. This roller has a width at least equal to d and has two electrically conducting portions 20 and 21, separated by an insulating portion 22. To facilitate operation of the apparatus of FIG. 1, the insulating strip 22 is preferably situated approximately in the center of roller 5.

(The total metal stripping roller 35 is not shown in the figure since it is simply formed by a completely metal roller).

FIG. 4 shows another variation of the invention for obtaining greater accuracy than with the device of FIG. 1. In fact, in FIG. 1, the film partially stripped of metal between 40 and 41 will be wound on mandrel 13 at the end of the capacitor, followed by several "dead" turns obtained by stripping the whole of the metal from film 1 by means of roller 35. However, the capacitive contribution provided by this portion 40,41 in cooperation with film 2 is not measured by bridge 9 at the moment when this latter generates an "end of capacity" signal. Accordingly, there exists an error all the higher, the greater this distance 40,41. In practice, roller 5 is placed as close as possible to point 40, but the error exists nevertheless.

In FIG. 4, the device shown allows any error to be eliminated. To this end, the total metal stripping roller 32 is disposed on mandrel 12, substantially at the point of contact of the two metal coated films 1 and 2 thereon (the metal coated surface of films 1 and 2 is then, in this case, contrary to that of FIG. 1, directed downwards). As before, the same elements bear the same references. When switch 37 is in contact with 38, the partial metal stripping roller 5 carries out metal stripping such as shown in FIG. 2. When the measuring bridge delivers a signal which switches over 37 to contact 39 (capacity C reached), the total metal stripping roller 32 is lowered and the voltage of source 6 allows film 1 to be completely stripped of metal. Accordingly, the film portion of film 1 disposed at that moment between 40 and 41 is then stripped of metal and the capacitor obtained has therefore exactly the value measured by bridge 9 at the moment when the signal was generated.

What is claimed is:

1. In a process for producing a wound capacitor of capacity C, in which at least two films of metal coated dielectric materials are wound one on the other, the metal layers forming the plates of said capacitor, the instantaneous capacity Cx of the capacitor being measured at all times by capacity measuring means, when Cx is close to but less than C, partial metal stripping of one of the metal coated films is carried out so as to maintain thereon a metal coated strip, connected electrically to the corresponding plate of the capacitor and allowing the value of capacity Cx to be adjusted accurately to the value C, without slowing down the winding speed of said capacitor.

2. The process as claimed in claim 1, wherein said metal coated strip extends substantially parallel to the edges of the dielectric film.

3. The process as claimed in claim 1 or 2, wherein said metal coated strip is disposed substantially at the center.

4. The process as claimed in claim 1, wherein the metal stripping operation is carried out by means of an electrically conducting roller comprising an insulating portion corresponding to the metal coated strip which remains on the dielectric film, said roller being in contact with the metal coated portion of the dielectric film and being brought to a sufficient potential, with respect thereto, for stripping the metal from the portions facing the electrically conducting zones.

5. The process as claimed in claim 1, wherein the partial metal stripping operation is followed by an operation for completely stripping said film of metal, controlled by the capacity measuring bridge.

6. A wound capacitor produced in accordance with the method of any one of claims 1 to 5.

7. An apparatus for producing a wound capacitor, comprising means for simultaneously winding on a mandrel two metal coated dielectric films, means for measuring the capacity of the capacitor being wound, as well as a partial metal stripping roller having at least one conducting portion and an insulating portion, and a total metal stripping roller, said total metal stripping roller being disposed with the partial metal stripping roller on a turret, each conducting portion being connected to one of the poles of a voltage source, the other pole of which is connected to an electrically conducting roller in contact with the metal layer of one of the films, said apparatus further comprising means for placing said roller in contact with said film under the action of a signal from the capacity measuring means.

8. The device as claimed in claim 7, wherein said total metal stripping roller is situated above the point of contact of said two metal coated films on the mandrel.

* * * * *